United States Patent Office 3,264,331
Patented August 2, 1966

3,264,331
ANDROSTANE HYDRAZONE DERIVATIVES AND METHODS FOR THEIR MANUFACTURE
Cecil H. Robinson, Timonium, Md., and Lawrence E. Finckenor, Wayne, N.J., assignors to Schering Corporation, Bloomfield, N.J., a corporation of New Jersey
No Drawing. Filed July 23, 1964, Ser. No. 384,791
7 Claims. (Cl. 260—397.5)

This application relates to novel steroidal derivatives, to methods for their manufacture, and to novel intermediates produced thereby. More particularly, this application relates to substituted hydrazone derivatives of steroids of the androstane series which are valuable as therapeutics per se or as intermediates in the preparation of other therapeutically valuable compounds. In particular, this application relates to steroids of the androstane series having at C–3 and/or at C–17 a hydrozone derivative substituted by a lower alkanoyl group.

Contemplated as being within the scope of this invention are compounds selected from the group consisting of androstanes defined by the following structural Formulae I and II, the 4-dehydro-, 1,4-bis-dehydro-, and the 19-nor-4-dehydro-analogs thereof; and the 19-nor 5(10)-dehydro-analogs of Formula I:

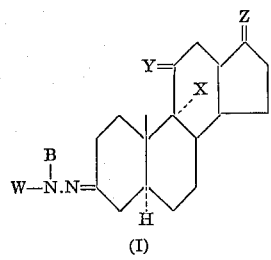

and

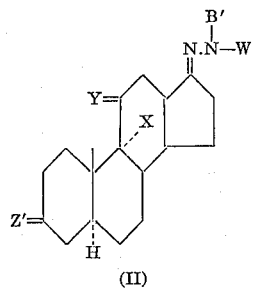

wherein W is lower alkanoyl; B is a member selected from the group consisting of hydrogen and lower alkanoyl; B' is a member selected from the group consisting of hydrogen and lower alkyl; X is a member selected from the group consisting of hydrogen and fluorine; Y is a member selected from the group consisting of hydrogen and (H, $\beta$OH); and when Y is hydrogen, X is hydrogen; Z is a member selected from the group consisting of $$\begin{matrix} OR \\ < \\ A \end{matrix}$$

R being a member selected from the group consisting of hydrogen and an acyl radical of a hydrocarbon carboxylic acid having up to 8 carbon atoms, and A being a member selected from the group consisting of hydrogen, ethinyl, and lower alkyl; and Z' is a member selected from the group consisting of keto, (H, $\beta$OR), and a mono-lower alkanoyl hydrazone derivative, and when Z' is mono-lower alkanoyl hydrazone, B' is hydrogen.

Also included in my invention are 17-dilower alkanoyl-hydrazone androstanes of the following Formula III:

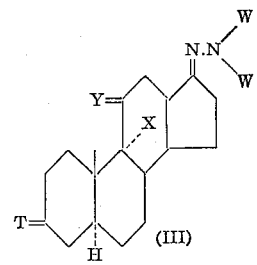

wherein T is a member selected from the group consisting of keto and (H, $\beta$OR), and R, X, Y, and W are as defined for Formulae I and II. The compounds of above Formula III are valuable as intermediates in preparing 3-keto-17-mono-acylhydrozono-A-ring-saturated androstanes of Formula II.

The lower alkanoyl substituents on the hydrazone function at C–3 and/or C–17 contemplated in this invention are those having up to 7-carbon atoms, such as, formyl, acetyl, caproyl, and the like.

By lower alkyl is contemplated hydrocarbon radicals, straight chain and branched, having up to 7 carbon atoms, including radicals such as methyl, ethyl, propyl, isopropyl, t-butyl, hexyl, heptyl, and the like.

Illustrative of the hydrocarbon carboxylic acid esters contemplated at C–3 and at C–17 are lower alkanoates such as acetate, propionate, butyrate, valerate, caproate, and t-butyl acetate; esters from unsaturated aliphatic acids such as tetrolate and acrylate; aroyl esters such as benzoate and toluate; and esters from dibasic organic acids such as succinate, phthalate, and sulfobenzoate. Also included in the term "acid radical" are the alkali metal salts of the dibasic carboxylic acid esters.

The above definition of the novel compounds of this invention should not be strictly construed but rather should be considered to admit as equivalent compounds those having the presence of other substituents on the steroid nucleus particularly at positions 2, 6, 9, 11, and 16 such as 2$\alpha$-methyl, 6$\alpha$-methyl, 6$\alpha$-fluoro, 6$\alpha$-chloro, 9$\alpha$,11$\beta$-dichloro, 16$\alpha$-methyl, 16$\beta$-methyl, and 16$\alpha$-acyloxy analogs of Formulae I, II and III. This modification depends solely on the choice of starting material employed, which in the present instance would involve the employment of a 3- and/or 17-keto-androstane possessing the desired substituent in the positions indicated, which substituents are introduced by methods known in the art.

In addition, considered as equivalents to the novel 3- and/or 17-lower alkanoylhydrazono-androstanes of this invention as exemplified by the compounds of Formulae I, II, and III, are those compounds of Formulae I, II, and III, wherein W is benzoyl or cyanoacetyl, e.g. androstan-17$\beta$-ol-3-one 3-benzoylhydrazone, androstan-17$\beta$-ol-3-one 3-cyanoacetylhydrazone.

It is, thus, apparent that this invention encompasses 3-lower alkanoylhydrazone-androstanes of Formula I (i.e. when B is hydrogen); 3-dilower alkanoylhydrazono-androstanes of Formula I (i.e. when B is lower alkanoyl); 17-lower alkanoylhydrazone-androstanes (when B' is hydrogen or lower alkyl); and 3,17-bis-lower alkanoylhydrazono androstanes of Formula II (i.e. when Z' is mono-lower alkanoyl hydrazone); and the Δ⁴-, Δ¹,⁴-analogs of the foregoing, as well as the 17-dilower alkanoylhydrazones of Formula III. Of the foregoing, the preferred class of compounds are the 3-mono-lower alkanoylandrostanes of Formula I since, as will be discussed further in this application, they possess a therapeutic activity superior to that possessed by other classes of compounds of this invention.

Illustrative of the 3-lower alkanoylhydrazono-androstanes defined by Formula I, including analogs thereof, are compounds such as androstan-17β-ol-3-one 3-acetylhydrazone and the 17-acetate and 17-cyclopentylpropionate esters thereof; 17α-methyl-androstan-17β-ol-3-one 3-acetylhydrazone, androstan-17β-ol-3-one 3-formylhydrazone, androstan-17β-ol-3-one 3-cyclopropylcarboxylic acid hydrazone; 17α-methyltestosterone 3-acetylhydrazone (i.e. 17α-methyl-4-androstan-17β-ol-3-one 3-acetylhydrazone); 17α-methyl-1-dehydrotestosterone 3-acetylhydrazone, 19-nor-testosterone 3-acetylhydrazone, 17α-ethinyl-19-nor-5(10)-androsten-17β-ol-3-one 3-acetylhydrazone, 17α-ethinyltestosterone 3-acetylhydrazone, 1,4-androstadien-3,17-dione 3,17-bis-monoacetylhydrazone, androstan-17β-ol-3-one 3-acetylhydrazone; and the 3-dilower alkanoylhydrazono-A-ring-saturated androstanes such as androstan-17β-ol-3-one 3-diacetylhydrazone and the 17-acetate ester thereof.

Typical 17-lower alkanoylhydrazono-androstanes of Formula II are compounds such as androstan-3β-ol-17-one 3-acetate 17-N-methyl-N-acetylhydrazone, 1,4-androstadien-3,17-dione 17-acetylhydrazone, androstane-3,17-dione 3,17-bis-monoacetylhydrazone, androstane-3,17-dione 17-acetylhydrazone.

Among the 17-dilower alkanoylhydrazono-androstanes of Formula III are derivatives such as androstane-3,17-dione 17-diacetylhydrazone and androstane-3β-ol-17-one 3-acetate 17-diacetylhydrazone.

Preferred compounds of this invention are the 3-mono-lower alkanoylhydrazone derivatives of Formula I and, particularly the A-ring saturated analogs such as androstan-17β-ol-3-one 3-formylhydrazone, androstan-17β-ol-3-one 3-acetylhydrazone and the 17-acetate esters, and the 17α-methyl analogs thereof.

The 3- and/or 17-lower alkanoylhydrazones of A-ring-saturated androstanes are conveniently prepared by treating the corresponding 3- and/or 17-keto A-ring-saturated androstane with a lower alkanoylhydrazine in tetrahydrofuran or methanol/acetic acid to obtain directly the corresponding 3- and/or 17-substituted hydrazone derivative. Thus, androstan-17β-ol-3-one upon treatment with monoacetylhydrazine in tetrahydrofuran, for example, or in methanol to which a catalytic amount of glacial acetic acid has been added, will yield androstan-17β-ol-3-one 3-acetylhydrazone. Similarly, androstan - 3β - ol - 17 - one, when treated with acetylhydrazine is converted to androstan-3β-ol-17-one 17-acetylhydrazone.

When preparing A-ring-unsaturated androstane lower alkanoylhydrazone derivatives of Formulae I and II by the aforedescribed process, i.e., by the action of an acylhydrazine, the choice of solvent medium is critical. If tetrahydrofuran alone is used as solvent, derivatives at C–17 only will form even when there are 3-keto groups present; whereas, if methanol/acetic acid is used, substituted hydrazone derivatives will form at C–3 as well as at C–17. Thus, when preparing 1,4-androstadiene-3,17-dione 17-acetylhydrazone, for example, a method of choice is to heat at reflux temperature a mixture of molar equivalent weights 1,4-androstadiene-3,17-dione and acetylhydrazone in tetrahydrofuran. On the other hand, when preparing the 3-acetylhydrazone derivative of 17α-ethinyl-19-nortestosterone, for example, a method of choice is to heat at reflux temperature a mixture of 17α-ethinyl-19-nortestosterone (i.e., 17α-ethinyl-19-nor-4-androstene-17β-ol-3-one) and a molar equivalent of acetylhydrazone in methanol/acetic acid.

The 17-lower alkanoylhydrazone derivatives of A-ring saturated androstanes and of A-ring unsaturated androstanes are also prepared via a two-step synthesis whereby the unsubstituted hydrazone function is first introduced such as by reaction of a 17-keto-androstane, e.g., androstan-3β-ol-17-one, with aqueous hydrazine in ethanol and triethylamine according to known procedures. The unsubstituted hydrazono-androstane thereby produced, e.g., androstan-3β-ol-17-one 17-hydrazone, upon treatment with an acid anhydride (e.g., acetic or propionic acid anhydride) in pyridine is converted to the corresponding acylhydrazone derivative with any free primary or secondary hydroxyl groups being concomitantly esterified, e.g., androstan-3β-ol-17-one 3-acetate 17-acetylhydrazone.

The 3,17-bis-monosubstituted hydrazono-androstanes of this invention, i.e., those compounds defined by Formula II wherein B' is hydrogen and Z' is a monosubstituted hydrazone, are prepared from the corresponding 3,17-diketo-androstanes utilizing techniques similar to those for preparing the 3-monosubstituted hydrazono-androstanes except that longer reaction times and a larger quantity of reagent are employed. Thus, 3,17-diketo-androstanes such as androstane-3,17-dione and 1,4-androstadiene-3,17-dione upon treatment at room temperature for several hours (e.g. 10–18 hours) with at least two molar equivalents of a monoacylhydrazine, e.g., acetylhydrazine, in methanol/acetic acid are each converted to the corresponding 3,17-bis-monoacetylhydrazone derivative. In A-ring unsaturated androstanes having keto groups both at C–3 and C–17, the keto group at C–17 forms an acylhydrazone derivative at a much faster rate than does the keto group at C–3. In those starting androstenediones having a 17-keto group and a 3-keto-1,4-diene system, the difference in the rate of hydrazone formation is such that, by proper control of reaction conditions such as restricting the reaction time, it is possible even when utilizing an acetic acid/methanol medium to prepare the 17-hydrazone derivative without prior protection of the reacting 3-keto group. This, then provides an alternative route for preparing 3-keto-17-lower alkanoylhydrazone-1,4-androstadienes in addition to the aforedescribed procedure utilizing tetrahydrofuran as solvent. Thus, when 1,4-androstadiene-3,17-dione is subjected to the action of about two moles of acetylhydrazine in methanol to which acetic acid has been added, for but an hour at room temperature, there is isolated the 17-mono derivative, 1,4-androstadiene-3,17-dione 17-acetylhydrazone; whereas, after eighteen hours, the 3,17-disubstituted derivative is isolated, i.e., 1,4-androstadiene-3,17-dione 3,17-bis-monoacetylhydrazone.

Similarly, by controlling reaction time, temperature, and quantity of reagent, the 17-mono-substituted derivative of a 17-keto-androstane having a 3-keto-Δ⁴-system may be prepared without prior protection of the reactive 3-keto group.

A novel process of this invention whereby a lower alkanoylhydrazone function is introduced at C–17 in 17-keto-A-ring-saturated-androstanes not having a 3-keto group (e.g., androstan-3β-ol-17-one) and in 17-keto-A-ring-unsaturated androstanes (e.g., 1,4-androstadiene-3,17-dione) involves the introduction of a 17-hydrazine group via the action of potassium azodicarboxylate

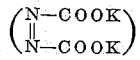

on the 17-keto-androstane followed by treatment of the androstane 17-hydrazone thereby formed (e.g., androstan-3β-ol-17-one 17-hydrazone and 1,4-androstadiene-3,17-dione 17-hydrazone, respectively) with an acid anhydride in pyridine (e.g., acetic anhydride in pyridine) to form a 17-acylhydrazono-androstane, e.g., androstan-3β-ol-17-one 3-acetate 17-acetylhydrazone and 1,4-androstadiene-3,17-dione 17-acetylhydrazone. This process is preferably not used when the starting compound is a 3-keto-A-ring-saturated androstane, since steroidal azines result. Additionally, in 3-keto-A-ring-unsaturated compounds, if too vigorous reaction conditions are employed (i.e., high temperatures over long periods of time) the 17-substituted androstane product will become contaminated with a steroidal azine product.

To prepare a 17-mono-substituted hydrazone derivative of a 3,17-diketo-androstane having a saturated A-ring, there may be utilized the following novel multi-step process. By this process, a 3,17-bis-lower alkanoylhydrazono-androstane is allowed to react with an acid anhydride preferably an anhydride of the same acid as the acyl substituent on the acylhydrazone function whereby there is formed the corresponding 3-keto-17-dilower alkanoylhydrazone derivative. Treatment of the 3-keto-17-dilower alkanoylhydrazono-androstane with reagents such as zinc in ethanol, zinc in acetic acid or an alkali metal hydroxide in a lower alkanol results in the formation of the desired 3-keto-17-monoacylhydrazono-androstane. Thus, for example, androstane-3,17-dione upon reaction with about two molar equivalents of acetylhydrazine is converted to androstane - 3,17 - dione 3,17 - bis - monoacetylhydrazone, which, in turn, is treated with refluxing acetic anhydride to form androstane - 3,17 - dione 17 - diacetylhydrazone, which, upon reaction with potassium hydroxide in ethanol yields the desired 3-keto-17-mono-substituted hydrazone, androstane-3,17-dione 17-acetylhydrazone. This procedure is the method of choice when preparing a 3-keto-17-substituted hydrazono-A-ring-saturated-androstane, since each step of this procedure results in high yields.

Alternatively, a 3-keto-17-lower alkanolyhydrazone of Formula II may be prepared via a four-step procedure utilizing a 3-keto-17-hydroxyandrostane as starting compound. According to this alternate procedure, the keto group at C-3 is first protected by known methods such as by formation of a ketal derivative, followed by oxidation of the 17-hydroxyl function, conversion of the thereby formed 17-keto group to an acylhydrazone derivative and finally hydrolysis of the 3-keto protective group. For example, androstan-17β-ol-3-one, upon treatment with ethylene glycol in the presence of an acid catalyst, yields 3-ethylenedioxy-androstan-17β-ol, which upon oxidation with chromic acid in pyridine yields the 17-keto compound, 3-ethylenedioxy-androstan-17-one, and treatment thereof with acetylhydrazine in methanol/acetic acid yields 3 - ethylenedioxy - androstan-17-one 17-acetylhydrazone. Regeneration of the 3-keto function via known procedures such as with dilute aqueous acetic acid yields androstane-3,17-dione 17-acetylhydrazone.

The aforedescribed alternate procedure is also useful when preparing a 17-acylhydrazone derivative of an androstane having a 3-keto-Δ⁴-system. Thus, testosterone, after conversion to 3-ethylenedioxy-5-androsten-17β-ol, is oxidized at C-17 by means of chromic acid in pyridine to produce 3-ethylenedioxy-5-androsten-17-one, which upon treatment with acetylhydrazine in tetrahydrofuran or acetic acid/methanol yields 3-ethylenedioxy-5-androsten-17-one 17-acetylhydrazone. Regeneration of the 3-keto function such as with aqueous acetic acid yields 4-androstene-3,17-dione 17-acetylhydrazone.

The 3-dilower alkanoylhydrazone derivatives of this invention, i.e., those compounds defined by Formula I wherein B and W are both lower alkanoyl functions and wherein the androstane molecule has a saturated A-ring are preferentially prepared via a novel process of this invention whereby a 3-keto-A-ring-saturated androstane, e.g., androstan-17β-ol-3-one or the 17-acetate thereof is treated with ammonia and hydroxylamine-O-sulfonic acid to yield a 3-diaziridine intermediate III, e.g., 3-diaziridine-androstan-17β-ol which upon treatment with an acid anhydride in pyridine, e.g., acetic anhydride, will yield the desired 3-dilower alkanoylhydrazone androstane of Formula I', e.g., the 3-diacetylhydrazone of androstane-17β-ol 3-one 17-acetate, which under mild hydrolysis conditions such as with dilute methanolic potassium hydroxide (5%) at room temperature will yield the corresponding 17-hydroxy derivative (I''). The above procedure is specific for the preparation of 3-diacylhydrazone of 3-keto-A-ring saturated androstanes only. This procedure may be depicted by a structural formulae flow diagram as follows wherein X and Y are defined as for formulae I-III.

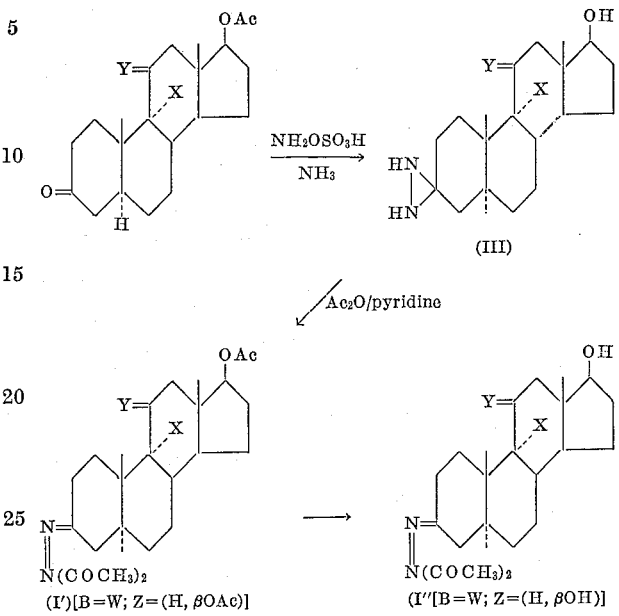

(I')[B=W; Z=(H, βOAc)]    (I'')[B=W; Z=(H, βOH)]

The yields for each step in the above procedure are excellent, making this the procedure of choice over an alternative process analogous to known procedures whereby there is first prepared a semicarbazone derivative at C-3 followed by treatment with an acid anhydride in pyridine to yield the 3-diacylhydrazone (such as I' above).

The 17 - N-alkyl-N-lower alkanoylhydrazone androstanes of Formula II, i.e., those compounds wherein B' is lower alkyl, are conveniently prepared from the corresponding 17-keto-androstane by first introducing a monoalkylhydrazone function by reaction with a monoalkylhydrazine according to known methods, followed by treatment of the thereby formed 17-N-alkylhydrazono-androstane with an acid anhydride in pyridine to obtain the corresponding N-alkyl-N-acylhydrazone. Thus, for example, androstan-3β-ol-17-one upon treatment with methylhydrazine according to known procedures is converted to androstan-3β-ol-17-one 17-N-methylhydrazone, which upon treatment with acetic anhydride in pyridine yields the 17-di-substituted hydrazone, i.e., androstan-3β-ol-17-one 17-N-methyl - N - acetylhydrazone. Treatment with other lower alkanoic acid anhydrides, such as caproic acid anhydride, will yield the corresponding N-methyl-N-acyl derivative, i.e., androstan-3β-ol-17-one 17-N-methyl-17-N-caproylhydrazone.

In preparing the novel 3- or 17-substituted hydrazono-androstanes of this invention, it is usually preferable to have all the desired substituents at C-9 and 11, for example, present in the starting 3- and/or 17-keto-androstane. Thus, when preparing androstane-11β,17β-diol-3-one 3-acetylhydrazone and the 9α-fluoro analog thereof, one preferably utilizes as starting derivative androstane-11β,17β-diol-3-one and 9α-fluoro-androstane-11β,17β-diol-3-one, respectively.

When preparing the 17-N-alkyl-N-lower alkanoylhydrazones of this invention or when employing the aforedescribed two-step general synthesis for the preparation of 17-monoacylhydrazones (i.e., by first introducing the hydrazone function followed by acetic anhydride treatment) any free secondary or primary hydroxyl group present will be esterified during the step involving treatment with a lower alkanoic acid anhydride in pyridine. If desired, such ester function may be hydrolyzed to the corresponding free hydroxy compound by mild methanolic potassium hydroxide treatment.

In general, 3- and/or 17-keto-androstanes, necessary starting compounds of this process are known, such as androstane-3,17-dione, androstan-3β-ol-17-one, androstan-17β-ol-3-one, 17α-methyl-androstan-17β-ol-3-one, testosterone (i.e., 4-androsten-17β-ol-3-one), 1,4-androstadiene-3,17-dione, 17α-methyl-testosterone, 19-nor-testosterone, 17α-ethinyl-19-nor-testosterone, 9α-fluoro-11β-hydroxytestosterone, 11β-hydroxyandrostane-3,17-dione and the like. Those 3- and/or 17-keto androstanes not readily available may be prepared from known compounds by utilizing procedures known in the art such as by the oxidative degradation of the C–17-side chain of a corticoid.

Of the monoacylhydrazine reagents utilized in preparing our novel compounds, many are known, such as acetylhydrazine, benzoylhydrazine, formylhydrazine, cyanoacetylhydrazine, and the like. If a desired monoacylhydrazone is not available, it can be conveniently prepared utilizing known procedures, i.e., by treating anhydrous hydrazine (i.e., 95%) with a lower carboxylic acid ester, e.g., ethyl acetate, at about 100° C. to obtain the corresponding lower carboxoyl hydrazine (i.e., acetyl-hydrazine).

Similarly, many of the monoalkylhydrazine intermediates are known, such as monomethylhydrazine and monoethylhydrazine. If not available, a monoalkylhydrazine is conveniently prepared in known manner by treating a substituted urea with a hypohalite, e.g., hypochlorite, or by treating an appropriate alkylamine with chloramine prepared in situ from sodium hypochlorite and ammonium hydroxide.

The substituted hydrazone derivatives of saturated androstanes such as defined by Formulae I and II, as well as the 4-dehydro-, 1,4-bis-dehydro-, and 19-nor-4-dehydro analogs thereof, possess androgenic/anabolic activity and may be administered in an analogous manner and for the same indications as known androgenic/anabolic agents. Of the foregoing, the 3-lower alkanoylhydrazone A-ring saturated derivatives of Formula I are preferred since they possess the most favorable ration of anabolic/androgenic activity.

The 3-lower alkanoylhydrazono-19-nor-5(10)-dehydroandrostanes of Formula I have been found to possess anti-fertility activity in rats. Additionally, these compounds are active as intermediates in the preparation of 3 - alkanoylhydrazono-10-hydroperoxy-19-nor-$\Delta^4$-steroids. For example, upon introduction of oxygen into a methylene chloride/hexane solution of 17α-ethinyl-19-nor-5(10)-androsten-17β-ol-3-one 3-acetylhydrazone, there is obtained 10-hydroperoxy-17α-ethinyl-19-nor-4-androsten-17β-ol-3-one 3-acetylhydrazone which possesses anti-fertility activity.

The following examples are for illustrative purposes only and not to be construed as limiting, the limit of our invention being defined by the appended claims:

EXAMPLE 1

*5α-androstan-17β-ol-3-one 3-acetylhydrazone 17-acetate*

Reflux for one hour a mixture of 1 g. of 5α-androstan-17β-ol-3-one 17-acetate and 1 g. of monoacetylhydrazine in 10 ml. of tetrahydrofuran. Cool the reaction mixture and filter the resultant precipitate comprising 5α-androstan-17β-ol-3-one 3-acetylhydrazone 17 - acetate. Purify by crystallization from acetone-hexane. M.P. 245–248° C., [α]$_D$ +15.8.

EXAMPLE 2

*5α-androstan-17β-ol-3-one 3-acetylhydrazone*

To a solution of 1 g. of 5α-androstan-17β-ol-3-one in 20 ml. of tetrahydrofuran, add 1 g. of monoacetylhydrazine. Reflux the reaction mixture for one-half hour; then cool to room temperature and filter the resultant precipitate comprising 5α-androstan-17β-ol-3-one 3-acetyl-hydrazone. Purify by crystallization from aqueous methanol. M.P. 232–235° C., [α]$_D$ +15.2.

EXAMPLE 3

*5α-androstan-17β-ol-3-one 3-acetylhydrazone 17-cyclopentylpropionate*

A. 5α-ANDROSTAN-17β-OL-3-ONE 17-CYCLOPENTYLPROPIONATE

To 3.04 g. of 5α-androstan-17β-ol-3-one in 50 ml. of dry distilled pyridine chilled to 0–10° C., add dropwise with stirring 5 g. of cyclopentylpropionyl chloride. Stir the reaction mixture for about 12 hours at room temperature; then pour with stirring into a mixture of 400 g. of ice and 100 ml. of concentrated sulfuric acid. Extract the acidic mixture with benzene; then wash the combined benzene extracts first with 10% sodium carbonate, then with water. Dry the washed benzene solution over magnesium sulfate; then evaporate to an oily residue comprising 5α-androstan-17β-ol-3-one 17-cyclopentylpropionate. Purify by chromatography on alumina eluting first with hexane, then with 1:1 hexane-benzene, and finally with benzene. Combine the benzene eluates and evaporate to a residue of 5α-androstan-17β-ol-3-one 17-cyclopentylpropionate.

B. 5α-ANDROSTAN-17β-OL-3-ONE 3-ACETYLHYDRAZONE 17-CYCLOPENTYLPROPIONATE

To a solution of 1 g. of 5α-androstan-17β-ol-3-one 17-cyclopentylpropionate in 20 ml. of tetrahydrofuran, add 200 mg. of monoacetylhydrazine. Reflux the mixture for one-half hour; then pour into 200 ml. of water and filter the resultant precipitate comprising 5α-androstan-17β-ol-3-one 3-acetylhydrazone 17-cyclopentylpropionate. Purify by crystallization twice from methanol. M.P. 207–211° C., [α]$_D$ +22.1.

EXAMPLE 4

*5α-androstan-3β-ol-17-one 3-acetate 17-acetylhydrazone*

A. 5α-ANDROSTAN-3β-OL-17-ONE 17-HYDRAZONE

To a solution of 1 g. of 5α-androstan-3β-ol-17-one in 10 ml. of dry ethanol, add 2 ml. of triethylamine and 6 ml. of 65% aqueous hydrazine. Reflux the reaction mixture for 2 hours; cool; pour into 200 ml. of water; then filter and dry the resultant precipitate substantially of 5α-androstan-3β-ol-17-one 17-hydrazone. Purify by crystallization from methylene chloride/isopropyl ether. M.P. 260–268° C., [α]$_D$ +48.5.

Alternatively, the compound of this example is prepared as follows:

To a solution of 1 g. of 5α-androstan-3β-ol-17-one in 20 ml. of methanol and 3.5 ml. of acetic acid, add with stirring over a fifteen minute period, 3 g. of potassium azadicarboxylate. Stir the reaction mixture at room temperature for two hours; then pour into 200 ml. of water and filter and dry the resultant precipitate comprising 5α-androstan-3β-ol-17-one 17-hydrazone. Purify in the manner described in Example 4A.

B. 5α-ANDROSTAN-3β-OL-17-ONE 3-ACETATE 17-ACETYLHYDRAZONE

Dissolve 1 g. of 5α-androstan-3β-ol-17-one 17-hydrazone in 10 ml. of pyridine and 1 ml. of acetic anhydride and allow the solution to stand at room temperature for 18 hours. Pour the reaction mixture into 100 ml. of water and filter and dry the resultant precipitate comprising 5α-androstan-3β-ol-17-one 3-acetate 17-acetylhydrazone. Purify by crystallization from methylene chloride-hexane. M.P. 203–206° C., [α]$_D$ +57.4.

Alternatively, treatment of 5α-androstan-3β-ol-17-one 3-acetate with monoacetyl hydrazine in tetrahydrofuran according to the procedure of Example 1 followed by isolation of the resultant product in the described manner will yield 5α-androstan-3β-ol-17-one 3-acetate 17-acetylhydrazone.

EXAMPLE 5

*5α-androstan-3β-ol-17-one 3-acetate 17-N-methylacetylhydrazone*

A. 5α-ANDROSTAN-3β-OL-17-ONE 17-METHYL-HYDRAZONE

Add 1 g. of 5α-androstan-3β-ol-17-one to 10 ml. of methylhydrazine and reflux the mixture for 17 hours. Cool the reaction mixture; then pour into water and filter and air dry the resultant precipitate comprising 5α-androstan-3β-ol-17-one 17-methylhydrazone. Purify by crystallization twice from acetone-hexane. M.P. 130–155° C. (dec.), $[\alpha]_D$ +72.9.

B. 5α-ANDROSTAN-3β-OL-17-ONE 3-ACETATE 17-N-METHYL-ACETYLHYDRAZONE

Dissolve 1 g. of 5α-androstan-3β-ol-17-one 17-methylhydrazone in 10 ml. of pyridine and 1 ml. of acetic anhydride. Allow the solution to stand at room temperature for 18 hours; then add 1 ml. of water and pour the reaction mixture into 100 ml. of water. Filter the resultant precipitate comprising 5α-androstan-3β-ol-17-one 3-acetate 17-N-methyl-acetylhydrazone. Purify by crystallization from acetone-hexane. M.P. 193–195° C., $[\alpha]_D$ +163.7.

EXAMPLE 6

*17α-methyl-5α-androstan-17β-ol-3-one 3-acetylhydrazone*

Allow a mixture of 1 g. of 17α-methyl-5α-androstan-17β-ol-3-one and 1.2 g. of acetylhydrazine in 40 ml. of methanol and 0.8 ml. of acetic acid to reflux for one hour. Pour the reaction mixture into 400 ml. of water and filter and dry the resultant precipitate comprising 17α-methyl-5α-androstan-17β-ol-3-one 3-acetylhydrazone. Purify by crystallization from methylene chloride-hexane. M.P. 260–264° C., $[a]_D$ −3.0.

Alternatively, the compound of this example is prepared as follows:

To a solution of 1 g. of 17a-methyl-5a-androstan-17β-ol-3-one in 20 ml. of tetrahydrofuran, add 1 g. of monoacetyl-hydrazine. Reflux the reaction mixture for one hour; than cool and pour into 200 ml. of water. Filter the resultant precipitate comprising 17α-methyl-5α-androstan-17β-ol-3-one 3-acetylhydrazone and purify in the manner described above.

EXAMPLE 7

*5α-androstan-17β-ol-3-one 3-formylhydrazone*

To a solution of 1 g. of 5α-androstan-17β-ol-3-one in 40 ml. of methanol and 0.8 ml. of glacial acetic acid, add 2.0 g. of formylhydrazine. Reflux the reaction mixture for 2 hours; then pour into 400 ml. of water and filter and dry the resultant precipitate substantially of 5α-androstan-17β-ol-3-one 3-formylhydrazone. Purify by crystallization from methylene chloride-methanol-hexane. M.P. 255–260°/C., $[\alpha]_D^{\text{pyridine}}$ +19.3.

EXAMPLE 8

*5α-androstan-17β-ol-3-one 3-cyclopropylcarboxylic acid hydrazone*

Reflux for 2 hours a mixture of 1 g. of 5α-androstan-17β-ol-3-one and 2 g. of cyclopropylcarboxylic acid hydrazide in 40 ml. of methanol and 0.8 ml. of glacial acetic acid. Pour the cooled, reaction mixture into 400 ml. of water and filter and dry resultant precipitate comprising 5α-androstan-17β-ol-3-one 3-cyclopropylcarboxylic acid hydrazone. Purify by crystallization from methylene chloride-hexane. M.P. 244–248° C., $[\alpha]_D$ +11.6.

EXAMPLE 9

*1,4-androstadiene-3,11,17-trione 17-acetylhydrazone*

A. 1,4-ANDROSTADIENE-3,11,17-TRIONE 17-HYDRAZONE

To a stirred solution of 5 g. of 1,4-androstadiene-3,11,17-trione in 200 ml. of methanol and 35 ml. of glacial acetic acid under an atmosphere of nitrogen, add portionwise over a one-half hour period 30 g. of solid potassium azodicarboxylate and stir the reaction mixture an additional hour. Pour the reaction mixture into water; extract with methylene chloride; wash the combined extracts with water; then dry over magnesium sulfate and concentrate in vacuo to a residue substantially of 1,4-androstadiene-3,11,17-trione 17-hydrazone, which is used without further purification in Example 9B.

Purification can be effected by crystallization from acetone-hexane. M.P. 172–179° C. (dec.), $[\alpha]_D$ +123.1. +123.1.

B. 1,4-ANDROSTADIENE-3,11,17-TRIONE 17-ACETYLHYDRAZONE

To the 1,4-androstadiene-3,11,17-trione 17-hydrazone prepared in Example 9A, add 40 ml. of pyridine and 8 ml. of acetic anhydride and allow the mixture to stand overnight. Extract the reaction mixture with methylene chloride; wash the combined extracts with water, dry over magnesium sulfate, and concentrate in vacuo to a residue substantially of 1,4-androstradiene-3,11,17-trione 17-acetylhydrazone. Purify by sublimation at 200–220° C. (5.8μ); then crystallize the sublimed solid from acetone-hexane. M.P. 263–266° C., $[\alpha]_D$ +182.1.

EXAMPLE 10

*1,4-androstradiene-3,17-dione 17-acetylhydrazone*

In a manner similar to that described in Example 1, allow 1,4-androstadiene-3, 17-dione to react with monoacetyl-hydrazine in tetrahydrofuran. Isolate and purify the resultant product in the described manner to give 1,4-androstadiene-3,17-dione 17-acetylhydrazone.

Alternatively, the compound of this example is prepared as follows:

To a solution of 1 g. of 1,4-androstadiene-3,17-dione in 20 ml. of methanol and 0.8 ml. of glacial acetic acid, add 1.2 g. of acetylhydrazine. Allow the reaction mixture to stand at rom temperature for one hour; then pour into water and extract with methylene chloride. Wash the combined extracts with water, dry over magnesium sulfate, and concentrate in vacuo to a residue substantially of 1,4-androstadiene-3,17-dione 17-acetylhydrazone. Purify by crystallization from acetone-hexane. M.P. 238–241° C., $[\alpha]_D$ +130.

Purification can also be effected by sublimation at 220° C. (20μ) followed by crystallization from aqueous acetone.

EXAMPLE 11

*17α-methyl-4-androsten-17β-ol-3-one 3-acetylhydrazone*

To a solution of 1 g. of 17α-methyl-4-androsten-17β-ol-3-one in 20 ml. of methanol and 0.8 ml. of glacial acetic acid, add 1.2 g. of acetylhydrazine. Allow the reaction mixture to stand at room temperature for 18 hours; then pour into 200 ml. of water and filter and dry the resultant precipitate comprising 17α-methyl-4-androsten-17β-ol-3-one 3-acetylhydrazone. Purify by crystallization from acetone-hexane. M.P. 142–148° C., (bubbling dec.), $[\alpha]_D$ +187.2.

EXAMPLE 12

*17α-methyl-1,4-androstadien-17β-ol-3-one 3-acetylhydrazone*

Allow a mixture of 1 g. of 17α-methyl-1,4-androstadien-17β-ol-3-one and 1.2 g. of acetylhydrazine in 20 ml. of methanol and 0.8 ml. of glacial acetic acid to stand at room temperature for 96 hours. Pour the reaction mixture into 200 ml. of water and filter and dry the resultant precipitate comprising 17α-methyl-1,4-androstadiene-17β-ol-3-one 3-acetylhydrazone. Purify by chromatography on Chromosorb W (Johns Manville) saturated with toluene, eluting with toluene. Combine the like fractions and evaporate to a residue; then purify the residue by crystallization from methanol-water. M.P. 134–139° C., $[\alpha]_D$ +64.6.

EXAMPLE 13

*5α-androstan-17β-ol-3-one 3-cyanoacetylhydrazone*

Dissolve 1 g. of 5α-androstan-17β-ol-3-one in 20 ml. of warm methanol and 0.8 ml. of acetic acid. Add 2 g. of cyanoacetylhydrazine, then 20 ml. of methanol and reflux the resultant heavy suspension for one-half hour. Cool the reaction mixture, add 80 ml. of water, and filter the resultant precipitate comprising 5α-androstan-17β-ol-3-one 3-cyanoacetylhydrazone. Purify by crystallization from methylene chloride/methanol. M.P. 230–233° C. (bubbling dec.), $[\alpha]_D^{pyridine}$ +20.6.

EXAMPLE 14

*19-nor-4-androsten-17β-ol-3-one 3-acetylhydrazone*

Stir at room temperature until a clear solution is obtained a mixture of 1 g. of 19-nor-4-androsten-17β-ol-3-one and 1 g. of monoacetylhydrazine in 20 ml. of methanol and 0.8 ml. of glacial acetic acid. After solution is effected, continue stirring for 18 hours; then pour into water. Extract the reaction mixture with methylene chloride; then wash the combined extracts with water, dry over magnesium sulfate and concentrate in vacuo to a residue comprising 19-nor-4-androsten-17β-ol-3-one 3-acetylhydrazone. Purify by crystallization from acetone-hexane. M.P. 226–232° C., $[\alpha]_D$ +173.1.

EXAMPLE 15

*17α-ethinyl-19-nor-4-androsten-17β-ol-3-one 3-acetylhydrazone*

To 1.75 g. of 17α-ethinyl-19-nor-4-androsten-17β-ol-3-one, add a solution of 1.75 g. of acetylhydrazine in 30 ml. of methanol and 1.2 ml. of glacial acetic acid. Heat the solution at reflux temperature for one hour; then pour into 400 ml. of water and filter the resultant precipitate comprising 17α-ethinyl-19-nor-4-androsten-17β-ol-3-one 3-acetylhydrazone. Purify by crystallization from acetone-hexane. M.P. 157–162° C.

EXAMPLE 16

*5α-androstan-17β-ol-3-one 3-benzoylhydrazone*

Dissolve 1 g. of 5α-androstan-17β-ol-3-one in 40 ml. of methanol and 0.8 ml. of acetic acid; then add 2 g. of benzoylhydrazine. Reflux the reaction mixture for one-half hour; then dilute with 80 ml. of water and cool. Filter and air-dry the resultant precipitate comprising 5α-androstan-17β-ol-3-one 3-benzoylhydrazone. Purify by crystallization from methanol. M.P. 196–199° C., $[\alpha]_D$ +7.9.

EXAMPLE 17

*1,4-androstadiene-3,17-dione 3,17-bis-monoacetylhydrazone*

To a solution of 1 g. of 1,4-androstadiene-3,17-dione in 20 ml. of methanol and 0.8 ml. of glacial acetic acid, add 1.6 g. of monoacetylhydrazine. Allow the reaction mixture to stand at room temperature for 18 hours; then filter the resultant precipitate comprising 1,4-androstadiene-3,17-dione 3,17-bis-monoacetylhydrazone. Purify by crystallization from aqueous methanol. M.P. 307–310° C., $[\alpha]_D^{pyridine}$ +321.7.

In a similar manner, allow 5α-androstane-3,17-dione to react with monoacetylhydrazine in the above-described manner to obtain 5α-androstane-3,17-dione 3,17-bis-monoacetylhydrazone. Purify by crystallization from acetone-hexane.

EXAMPLE 18

*5α-androstane-3,17-dione 17-acetylhydrazone*

A. 5α-ANDROSTANE-3,17-DIONE 17-DIACETYLHYDRAZONE

Add 1 g. of 5α-androstane-3,17-dione 3,17-bis-monoacetylhydrazone to 10 ml. of acetic anhydride. Stir at room temperature for 15 minutes; then heat at reflux temperature for one hour. Cool and pour the reaction mixture into 100 ml. of water and stir the mixture at room temperature for one hour. Filter and air-dry the resultant preciptate comprising 5α-androstane-3,17-dione 17-diacetylhydrazone. Purify by chromatography on silica gel eluting with 50% ethyl acetate/chloroform. Combine those fractions containing 5α-androstane-3,17-dione 17-diacetylhydrazone as determined by infrared spectra and thin layer chromatography. Evaporate and crystallize the resultant residue from acetone-hexane.

B. 5α-ANDROSTANE-3,17-DIONE 17-ACETYLHYDRAZONE

To a solution of 1 g. of 5α-androstane-3,17-dione 17-diacetylhydrazone in 90 ml. of ethanol, add a solution of 1 g. of potassium hydroxide in 10 ml. of water. Heat the reaction mixture at reflux temperature for one hour; then cool and dilute with 400 ml. of methylene chloride. Wash the organic solution with water to neutrality; then dry over magnesium sulfate and concentrate to a residue comprising 5α-androstane-3,17-dione 17-acetylhydrazone. Purify by crystallization from acetone-hexane.

EXAMPLE 19

*5α-androstan-17β-ol-3one 17-acetate 3-diacetylhydrazone*

The requisite starting material, i.e., 5α-androstan-17β-ol-3-one 3-semicarbizone, is prepared by treating 5α-androstan-17β-ol-3-one with semicarbazide hydrochloride and sodium acetate in methanol according to known procedures.

To a solution of 4.8 g. of 5α-androstan-17β-ol-3-one 3-semicarbazone in 96 ml. of pyridine, add 48 ml. of acetic anhydride and heat at reflux temperature for 5 hours. Concentrate the reaction mixture in vacuo to a residue comprising 5α-androstan-17β-ol-3-one 17-acetate 3-diacetylhydrazone. Purify by chromatography on silica gel eluting with chloroform/ethyl acetate (9:1). Combine those fractions containing 5α-androstan-17β-ol-3-one 17-acetate 3-diacetylhydrazone as determined by thin layer chromatography and infrared spectra. Evaporate the combined fractions to a residue and crystallize the residue from methanol/water and recrystallize from aqueous acetone. M.P. 224–228° C., $[\alpha]_D$ +12.9.

EXAMPLE 20

*5α-androstan-17β-ol-3-one 3-diacetylhydrazone*

Add 1 g. of 5α-androstan-17β-ol-3-one 17-acetate 3-diacetylhydrazone to 100 ml. of 10% ethanolic potassium hydroxide. Heat the reaction mixture at reflux temperature for one hour; then cool and dilute with 100 ml. of methylene chloride. Wash the organic solution with water; then dry over magnesium sulfate and evaporate in vacuo to a residue comprising 5α-androstan-17β-ol-3-one 3-diacetylhydrazone. Purify by crystallization from isopropanol/water. M.P. 206–208° C., $[\alpha]_D$ +15.6.

EXAMPLE 21

*5α-androstan-3β-ol-17-one 3-acetate 17-diacetylhydrazone*

Add 1 g. of 5α-androstan-3β-ol-17-one 3-acetate 17-acetylhydrazone (the compound of Example 4B) to 10 ml. of acetic anhydride and heat at reflux temperature for one hour. Concentrate the reaction mixture to a volume of 5 ml.; then cool. Filter the resultant precipiate comprising 5α-androstan-3β-ol-17-one 3-acetate 17-diacetylhydrazone. Purify by crystallization from acetone-hexane. M.P. 200–204° C., $[\alpha]_D$ +26.

EXAMPLE 22

*17α-ethinyl-19-nor-5(10)-androsten-17β-ol-3-one 3-acetylhydrazone*

To a solution of 1 g. of 17α-ethinyl-19-nor-5(10)-androsten-17β-ol-3-one in 15 ml. of methanol, add 1 g. of monoacetylhydrazine and immediately add 0.8 ml. of glacial acetic acid. To the precipitate which forms, add 5 ml. of methanol and filter. Wash the filtered precipitate with methanol and allow it to dry, yielding 17α-ethinyl-19-nor-5(10)-androsten - 17β - ol-3-one 3-acetylhydrazone.

Purify by crystallization with methanol or, alternatively, with acetone-hexane. M.P. 175 to 181° C.;

$\lambda_{max.}^{methanol}$ 230 mμ (12,900), $[α]_D$ +140.4° (dioxane)

In a similar manner allow each of the following to react with acetylhydrazine in acetic acid/methanol:

19-nor-5(10)-androsten-17β-ol-3-one,
19-nor-5(10)-androsten-17β-ol-3-one 17-acetate,
17α-methyl-19-nor-5(10)-androsten-17β-ol-3-one,
17α-ethinyl-19-nor-5(10)-androsten-17β-ol-3-one, and
17α-propyl-19-nor-5(10)-androstan-17β-ol-3-one.

Isolate each of the resultant products in the above described manner to obtain respectively:

19-nor-5(10)-androsten-17β-ol-3-one 3-acetylhydrazone,
19-nor-5(10)-androsten-17β-ol-3-one 17-acetate 3-acetylhydrazone,
17α-methyl-19-nor-5(10)-androsten-17β-ol-3-one 3-acetylhydrazone,
17α-ethinyl-19-nor-5(10)-androsten-17β-ol-3-one 3-acetylhydrazone, and
17α-propyl-19-nor-5(10)-androstan-17β-ol-3-one 3-acetylhydrazone.

EXAMPLE 23

*3-acetylhydrazone derivatives of 3-keto-17β-hydroxyandrostanes*

In a manner similar to that described in Example 6, allow each of the following to react with acetylhydrazine in methanol/acetic acid:

9α-fluoro-17α-methyl-5α-androstane-11β,17β-diol-3-one,
2α-methyl-5α-androstan-17β-ol-3-one 17-acetate,
2α,17α-dimethyl-5α-androstan-17β-ol-3-one,
17α-methyl-5α-androstane-11β,17β-diol-3-one,
9α-fluoro-17α-methyl-4-androtene-11β,17β-diol-3-one,
17α-methyl-19-nor-4-androstene-11β,17β-diol-3-one,
17α-ethinyl-19-nor-4-androsten-17β-ol-3-one,
17α-ethinyl-19-nor-4-androstene-11β,17β-diol-3-one,
4-androsten-17β-ol-3-one,
1,4-androstadien-17β-ol-3-one,
6α-fluoro-1,4-androstadien-17β-ol-3-one,
17α-methyl-1,4-androstadiene11β,17β-diol-3-one,
17α-ethinyl-1,4-androstadiene-11β,17β-diol-3-one,
17α-ethinyl-1,4-androstadien-17β-ol-3-one,
1-methyl-17α-ethinyl-19-nor-4-androsten-17β-ol-3-one, and
6α-methyl-4-androsten-17β-ol-3-one.

Isolate and purify each of the resultant products in the described manner to yield, respectively:

9α-fluoro-17α-methyl-5α-androstane-11β,17β-diol-3-one 3-acetylhydrazone,
2α-methyl-5α-androstan-17β-ol-3-one 17-acetate 3-acetylhydrazone,
2α,17α-dimethyl-5α-androstan-17β-ol-3-one 3-acetylhydrazone,
17α-methyl-5α-androstane-11β,17β-diol-3-one 3-acetylhydrazone,
9α-fluoro-17α-methyl-4-androstene-11β,17β-diol-3-one 3-acetylhydrazone,
17α-methyl-19-nor-4-androstene-11β,17β-diol-3-one 3-acetylhydrazone,
17α-ethinyl-19-nor-4-androsten-17β-ol-3-one 3-acetylhydrazone,
17α-ethinyl-19-nor-4-androstene-11β,17β-diol-3-one 3-acetylhydrazone,
4-androsten-17β-ol-3-one 3-acetylhydrazone,
1,4-androstadien-17β-ol-3-one 3-acetylhydrazone,
6α-fluoro-1,4-androstadien-17β-ol-3-one 3-acetylhydrazone,
17α-methyl-1,4-androstadiene-11β,17β-diol-3-one 3-acetylhydrazone,
17α-ethinyl-1,4-androstadiene-11β,17β-diol-3-one 3-acetylhydrazone,
17α-ethinyl-1,4-androstadien-17β-ol-3-one 3-acetylhydrazone,
1-methyl-17α-ethinyl-19-nor-4-androsten-17β-ol-3-one 3-acetylhydrazone, and
6α-methyl-4-androsten-17β-ol-3-one 3-acetylhydrazone.

EXAMPLE 24

*Acetylhydrazone derivatives of 3,17-diketo-androstenes*

A. 17-MONOACETYLHYDRAZONE DERIVATIVES

In a manner similar to that described in Example 1, allow each of the following to react with monoacetylhydrazine in tetrahydrofuran:

9α-fluoro-1,4-androstadien-11β-ol-3,17-dione,
6α-fluoro-1,4-androstadien-11β-ol-3,17-dione,
6α-fluoro-1,4-androstadiene-3,17-dione,
9α-fluoro-4-androsten-11β-ol-3,17-dione,
19-nor-4-androsten-11β-ol-3,17-dione,
16β-methyl-19-nor-4-androstene-3,17-dione,
19-nor-4-androstene-3,17-dione,
6α-fluoro-4-androstene-3,17-dione, and
6α-methyl-4-androsten-11β-ol-3,17-dione.

Isolate and purify each of the resultant products in the manner described in Example 1 to obtain, respectively:

9α-fluoro-1,4-androstadien-11β-ol-3,17-dione 17-acetylhydrazone,
6α-fluoro-1,4-androstadien-11β-ol-3,17-dione 17-acetylhydrazone,
6α-fluoro-1,4-androstadiene-3,17-dione 17-acetylhydrazone,
9α-fluoro-4-androsten-11β-ol-3,17-dione 17-acetylhydrazone,
19-nor-4-androsten-11β-ol-3,17-dione 17-acetylhydrazone,
16β-methyl-19-nor-4-androstene-3,17-dione 17-acetylhydrazone,
19-nor-4-androstene-3,17-dione 17-acetylhydrazone,
6α-fluoro-4-androstene-3,17-dione 17-acetylhydrazone, and
6α-methyl-4-androsten-11β-ol-3,17-dione 17-acetylhydrazone.

B. THE 3,17-BIS-MONOACETYLHYDRAZONES

In a manner similar to that described in Example 6, allow each of the products obtained in above Example 24A to react with monoacetylhydrazine in methanol/acetic acid.

Isolate and purify each of the resultant products in a manner similar to that described above to obtain, respectively:

9α-fluoro-1,4-androstadien-11β-ol-3,17-dione 3,17-bis-monoacetylhydrazone,
6α-fluoro-1,4-androstadien-11β-ol-3,17-dione 3,17-bis-monoacetylhydrazone,
6α-fluoro-1,4-androstadiene-3,17-dione 3,17-bis-monoacetylhydrazone,
9α-fluoro-4-androsten-11β-ol-3,17-dione 3,17-bis-monoacetylhydrazone,
19-nor-4-androsten-11β-ol-3,17-dione 3,17-bis-monoacetylhydrazone,
16β-methyl-19-nor-4-androstene-3,17-dione 3,17-bis-monoacetylhydrazone,
19-nor-4-androstene-3,17-dione, 3,17-bis-monoacetylhydrazone,
6α-fluoro-4-androstene-3,17-dione, 3,17-bis-monoacetylhydrazone, and
6α-methyl-4-androsten-11β-ol-3,17-dione 3,17-bis-monoacetylhydrazone.

EXAMPLE 25

*5α-androstan-17β-ol-3-one 3-diacetylhydrazone*

A. 3-DIAZIRIDINE-5α-ANDROSTAN-17β-OL

To 266 ml. of liquid ammonia cooled in a Dry Ice-acetone bath, add a solution of 10 g. of 5α-androstan-17β-ol-3-one in 266 ml. of absolute ethanol. Stir this mixture for 10 minutes in the Dry Ice-acetone bath; then add 4–86 g. of hydroxylamine-O-sulfonic acid and continue stirring at −40° C. for two hours. Allow the reaction mixture to slowly rise to room temperature and the ammonia to evaporate; then air evaporate the solution to a residue. Extract the residue with refluxing ether at least four times. Dry combined ether extracts over sodium sulfate; then concentrate to a residue comprising 3-diaziridine-5α-androstan-17β-ol. This compound is used without purification in procedure B immediately following.

In a similar manner, allow each of the following 5α-testosterone derivatives to react with hydroxylamine-O-sulfonic acid:

17α-methyl-5α-androstan-17β-ol-3-one,
9α-fluoro-17α-methyl-5α-androstane-11β,17β-diol-3-one, and
17α-methyl-5α-androstane-11β,17β-diol-3-one.

Isolate and purify each of the resultant products in a manner similar to that described above to obtain, respectively:

3-diaziridine-17α-methyl-5α-androstan-17β-ol,
3-diaziridine-9α-fluoro-17α-methyl-5α-androstane-11β,17β-diol, and
3-diaziridine-17α-methyl-5α-androstane-11β,17β-diol.

B. 5α-ANDROSTAN-17β-OL-3-ONE 3-DIACETYL-HYDRAZONE 17-ACETATE

Dissolve 1 g. of 3-diaziridine-5α-androstan-17β-ol (prepared in preceding Example 25A) in 10 ml. of pyridine and 1 ml. of acetic anhydride. Allow the solution to stand at room temperature for 18 hours; then add 1 ml. of water and pour the reaction mixture into 100 ml. of water. Filter the resultant precipitate comprising 5α-androstan-17β-ol-3-one 3-diacetylhydrazone 17-acetate. Purify by crystallization from acetone-hexane.

In a similar manner, allow each of the 3-diaziridine derivatives prepared as described in the second paragraph of Example 25A to react with acetic anhydride and pyridine to obtain, respectively:

17α-methyl-5α-androstan-17β-ol-3-one,
3-diacetylhydrazone,
9α-fluoro-17α-methyl-5α-androstane-11β,17β-diol-3-one,
3-diacetylhydrazone, and
17α-methyl-5-androstane-11β,17β-diol-3-one 3-diacetylhydrazone.

C. 5α-ANDROSTAN-17β-OL-3-ONE-3-DIACETYL-HYDRAZONE

In a manner similar to that described in Example 20, allow 5α-androstan-17β-ol-3-one 3-diacetylhydrazone 17-acetate to react with 10% ethanolic potassium hydroxide. Isolate and purify the resultant product in a manner similar to that described to give 5α-androstan-17β-ol-3-one 3-diacetylhydrazone. Purify by crystallization from isopropanol/water.

We claim:

1. A member selected from the group consisting of androstanes of Formulae I and II, the 4-dehydro-, 1,4-bis-dehydro-, and 19-nor-4-dehydro analogs thereof; and the 19-nor-5(10)-dehydro analogs of Formula I:

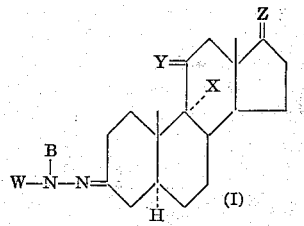

and

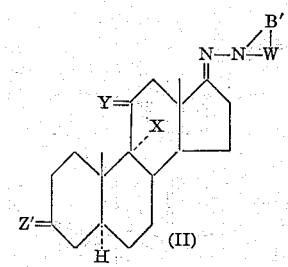

wherein W is lower alkanoyl; B is lower alkanoyl; B' is a member selected from the group consisting of hydrogen and lower alkyl; X is a member selected from the group consisting of hydrogen and fluorine; Y is a member selected from the group consisting of hydrogen and (H, βOH), and when Y is hydrogen, X is hydrogen; Z is a member selected from the group consisting of

R being a member selected from the group consisting of hydrogen and an acyl radical of a hydrocarbon carboxylic acid having up to 8 carbon atoms, and A being a member selected from the group consisting of hydrogen, ethinyl, and lower alkyl; and Z' being a member selected from the group consisting of keto and lower alkanoylhydrazone, and when Z' is lower alkanoylhydrazone B' is hydrogen.

2. A compound of claim 1 wherein B and W are acetyl; X and Y are hydrogen, and Z is (H, βOH), said compound having the name androstan-17β-ol-3-one 3-diacetylhydrazone.

3. A compound having the following structural formula:

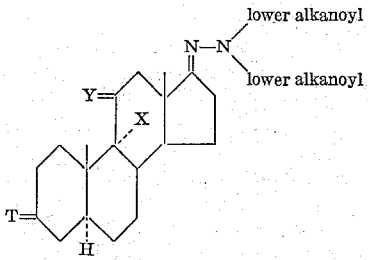

wherein T is a member selected from the group consisting of keto and (H, βOR), R being a member selected from the group consisting of H and an acyl radical of a hydrocarbon carboxylic acid having up to 8 carbon atoms, X is a member selected from the group consisting of hydrogen and fluorine; Y is a member selected from the group consisting of hydrogen and (H, βOH); and when Y is hydrogen, X is hydrogen.

4. The process which comprises reacting with potassium azodicarboxylate a steroid selected from the group consisting of 3-(H, βOR)-9α-X-11β-Y-5α-androstan-17-one, 9α-X-11β-Y-4-androstene-3,17-dione, and 9α-X-11β-Y-1,4-androstadiene-3,17-dione, wherein R is a member selected from the group consisting of hydrogen, lower alkyl, and an acid radical of a hydrocarbon carboxylic acid having up to 8 carbon atoms, X is a member selected from the group consisting of hydrogen and fluorine; and Y is a member selected from the group consisting of hydrogen and hydroxyl and when Y is hydrogen, X is hydrogen; and treating the thereby formed corresponding 17-hydrazone derivative in pyridine with an anhydride of a lower alkanoic acid to obtain the corresponding 17-lower alkanoylhydrazone derivative.

5. The process for preparing $9\alpha$-X-$11\beta$-Y-17-Z-$5\alpha$-androstane-3-one 3-dilower alkanoylhydrazone wherein X is a member selected from the group consisting of hydrogen and fluorine; Y is a member selected from the group consisting of hydrogen and hydroxyl, and when Y is hydrogen, X is hydrogen; and Z is a member selected from the group consisting of $$\diagup\begin{matrix}OR\\A\end{matrix}$$

R being a member selected from the group consisting of hydrogen and an acyl radical of a hydrocarbon carboxylic acid having up to 8 carbon atoms, and A being a member selected from the group consisting of hydrogen and lower alkyl; which comprises reacting with ammonia and hydroxylamine-O-sulfonic acid, $9\alpha$-X-$11\beta$-Y-17-Z-$5\alpha$-androstan-3-one wherein X, Y and Z are as defined hereinabove; and reacting the thereby formed corresponding 3-diaziridine derivative with an anhydride of a lower alkanoic acid.

6. The process of preparing $9\alpha$-X-$11\beta$-Y-$5\alpha$-androstane-3,17-dione 17-lower alkanoylhydrazone wherein X is a member selected from the group consisting of hydrogen and fluorine; Y is a member selected from the group consisting of hydrogen and hydroxyl, and when Y is hydrogen, X is hydrogen; which comprises reacting $9\alpha$-X-$11\beta$-Y-$5\alpha$-androstane-3,17 - dione 3,17 - bis - monolower-alkanoylhydrazone wherein X and Y are as hereinabove defined; with an anhydride of a lower alkanoic acid; and treating the thereby formed $9\alpha$-X-$11\beta$-Y-$5\alpha$-androstane-3,17-dione 17-dilower alkanoylhydrazone with a reagent selected from the group consisting of zinc in a lower alkyl alcohol, zinc in a lower alkanoic acid, and an alkali metal hydroxide in a lower alkanol.

7. The process of preparing a compound selected from the group consisting of $9\alpha$-X-11-Y-$5\alpha$-androstane-3,17-dione 17-monolower alkanoylhydrazone, and the 4-dehydro- and 1,4-bis-dehydro analogs of the foregoing, wherein X is a member selected from the group consisting of hydrogen and fluorine, Y is a member selected from the group consisting of hydrogen and (H, $\beta$OH), and when Y is hydrogen, X is hydrogen; which comprises reacting a member selected from the group consisting of $9\alpha$-X-11-Y-$5\alpha$-androstane-3,17-dione, the 4-dehydro- and 1,4-bis-dehydro-analogs of the foregoing, wherein X and Y are as hereinabove defined, with a lower alkanoylhydrazine in a solvent selected from the group consisting of tetrahydrofuran and methanol/acetic acid.

References Cited by the Examiner

UNITED STATES PATENTS

| | | | |
|---|---|---|---|
| 2,200,307 | 5/1940 | Schoeller et al. | 260—397 |
| 2,306,635 | 12/1942 | Marker | 260—397.1 |
| 3,032,469 | 5/1962 | Gleason | 167—65 |

OTHER REFERENCES

Sidgwick: Organic Chemistry of Nitrogen, Oxford University Press London, pages 398–399 (1937).

LEWIS GOTTS, *Primary Examiner.*

HENRY FRENCH, *Assistant Examiner.*